United States Patent
Park et al.

(10) Patent No.: US 8,184,074 B2
(45) Date of Patent: May 22, 2012

(54) ACTIVE MATRIX ORGANIC LIGHT EMITTING DISPLAY

(75) Inventors: Sungcheon Park, Yongin-si (KR); Choonyul Oh, Yongin-si (KR); Kyoungsoo Lee, Yongin-si (KR)

(73) Assignee: Samsung Mobile Display Co., Ltd., Yongin (KR)

( * ) Notice: Subject to any disclaimer, the term of this patent is extended or adjusted under 35 U.S.C. 154(b) by 860 days.

(21) Appl. No.: 12/260,012

(22) Filed: Oct. 28, 2008

(65) Prior Publication Data

US 2009/0108744 A1    Apr. 30, 2009

(30) Foreign Application Priority Data

Oct. 29, 2007  (KR) .......................... 10-2007-0108769

(51) Int. Cl.
*G09G 3/30* (2006.01)
(52) U.S. Cl. ........................................................ 345/76
(58) Field of Classification Search .............. 345/76–83; 315/169.3; 313/463, 504
See application file for complete search history.

(56) References Cited

U.S. PATENT DOCUMENTS

| | | | |
|---|---|---|---|
| 5,914,682 A * | 6/1999 | Noguchi ........................ | 341/145 |
| 7,583,068 B2 * | 9/2009 | Wang ............................. | 323/284 |
| 2005/0258772 A1 * | 11/2005 | Park et al. ................... | 315/169.1 |
| 2006/0244697 A1 * | 11/2006 | Lee et al. ........................ | 345/77 |
| 2007/0139313 A1 * | 6/2007 | Choi .............................. | 345/76 |

FOREIGN PATENT DOCUMENTS

| | | |
|---|---|---|
| JP | 2004-064427 | 2/2004 |
| KR | 10-2005-0111921 A | 11/2005 |
| KR | 10-2006-0034025 A | 4/2006 |
| KR | 10-2006-0114483 A | 11/2006 |

OTHER PUBLICATIONS

Notice of Allowance dated Nov. 28, 2008 issued in priority Korean application No. 10-2007-0108769.

* cited by examiner

*Primary Examiner* — Jimmy H Nguyen
(74) *Attorney, Agent, or Firm* — Christie, Parker & Hale, LLP (57) ABSTRACT

An organic light emitting display keeps a constant grayscale in an organic light emitting display panel even if power supplied by a power supply is changed. The organic light emitting display includes: a switching unit for selecting and outputting a first source power or a second source power as a first reference power; a comparator for comparing the first reference power with the second source power and outputting a difference value between the first reference power and the second source power; an adder for adding the difference value to an initial second reference power to output as a second reference power, such that a voltage level of the second reference power is changed when a voltage level of the first reference power is changed; and a gamma voltage generator for generating plural gamma voltages to be utilized for displaying the image on an organic light emitting display panel by utilizing the first and second reference powers.

18 Claims, 4 Drawing Sheets

ACTIVE MATRIX ORGANIC LIGHT EMITTING DISPLAY

CROSS-REFERENCE TO RELATED APPLICATION

This application claims priority to and the benefit of Korean Patent Application No. 10-2007-0108769 filed on Oct. 29, 2007 in the Korean Intellectual Property Office (KIPO), the entire content of which is incorporated by reference herein.

BACKGROUND OF THE INVENTION

1. Field of the Invention

The present invention relates to an organic light emitting display, and more particularly to an active matrix organic light emitting display.

2. Description of the Related Art

Generally, an organic light emitting display includes an organic light emitting display panel having a plurality of pixel circuits, a power supply for supplying power to the pixel circuits of the organic light emitting display panel, a data driver for supplying a data signal to the pixel circuits of the organic light emitting display panel line by line, and a gamma voltage generator for supplying a gamma voltage corresponding to the data signal to the data driver.

A current corresponding to the data signal is supplied to the pixel circuits formed in the organic light emitting display panel using the power supplied from the power supply, thereby allowing each organic light emitting device to emit light having a corresponding brightness.

A source of the power supplied to the pixel circuits of the organic light emitting display panel from the power supply is different from that of the data signal supplied to the pixel circuits of the organic light emitting display panel from the data driver. In more detail, the power supply generates positive power and negative power, for example, from a DC-DC converter or a switching regulator, and supplies the power to each pixel circuit of the organic light emitting display panel. However, the gamma voltage generator outputs a gamma voltage whose source is different from that of the power supply to the data driver by using a separate power whose level is shifted and not related to the power supply, as a reference power source. That is, the data driver supplies a data signal to the pixel circuits of the organic light emitting display panel, using the gamma voltage whose source is different from that of the power supply.

Thus, even if the same data as the previous data is outputted by the gamma voltage generator and the data driver, the current supplied to the pixel circuits of the organic light emitting display panel is changed when the power supplied to the pixel circuits by the power supply is changed.

Further, a reference power inputted to the gamma voltage generator is always set to the same value. Thus, when the power from the power supply is changed, the gray level of light emitted by each organic light emitting diode in the display panel is changed somewhat. In other words, the gray level of each organic light emitting diode in the display panel becomes different form each other and thus, uniformity of screen quality is reduced.

In addition, when the size of the organic light emitting display panel is increased, the power supplied to the pixel circuits from the power supply may become less stable. Thus, there is a problem in that the screen quality is degraded according to increase of the size of the organic light emitting display panel.

SUMMARY OF THE INVENTION

Accordingly, an aspect of an exemplary embodiment according to the present invention is to provide an organic light emitting display that can keep a substantially constant grayscale at an organic light emitting display panel even if power supplied by a power supply is changed.

According to an aspect of an exemplary embodiment of the present invention, there is provided an organic light emitting display, which includes: a switching unit for selecting and outputting a first source power or a second source power as a first reference power; a comparator for comparing the first reference power with the second source power and outputting a difference value between the first reference power and the second source power; an adder for adding the difference value to an initial second reference power to output as a second reference power, such that a voltage level of the second reference power is changed when a voltage level of the first reference power is changed; and a gamma voltage generator for generating plural gamma voltages to be utilized for displaying the image on an organic light emitting display panel by utilizing the first and second reference powers.

According to an aspect of another exemplary embodiment of the present invention, a method of driving an organic light emitting display is provided. The method includes: selecting a first source power or a second source power to output as a first reference power; comparing a voltage level of the first reference power supplied to a gamma voltage generator with a voltage level of the second source power; and adding a difference between the voltage levels of the first reference power and the second source power to a second reference voltage and providing the second reference voltage to the gamma voltage generator.

BRIEF DESCRIPTION OF THE DRAWINGS

The present invention will be more apparent from the following detailed description taken in conjunction with the accompanying drawing, in which.

DETAILED DESCRIPTION OF EXEMPLARY EMBODIMENTS

Figure 1:
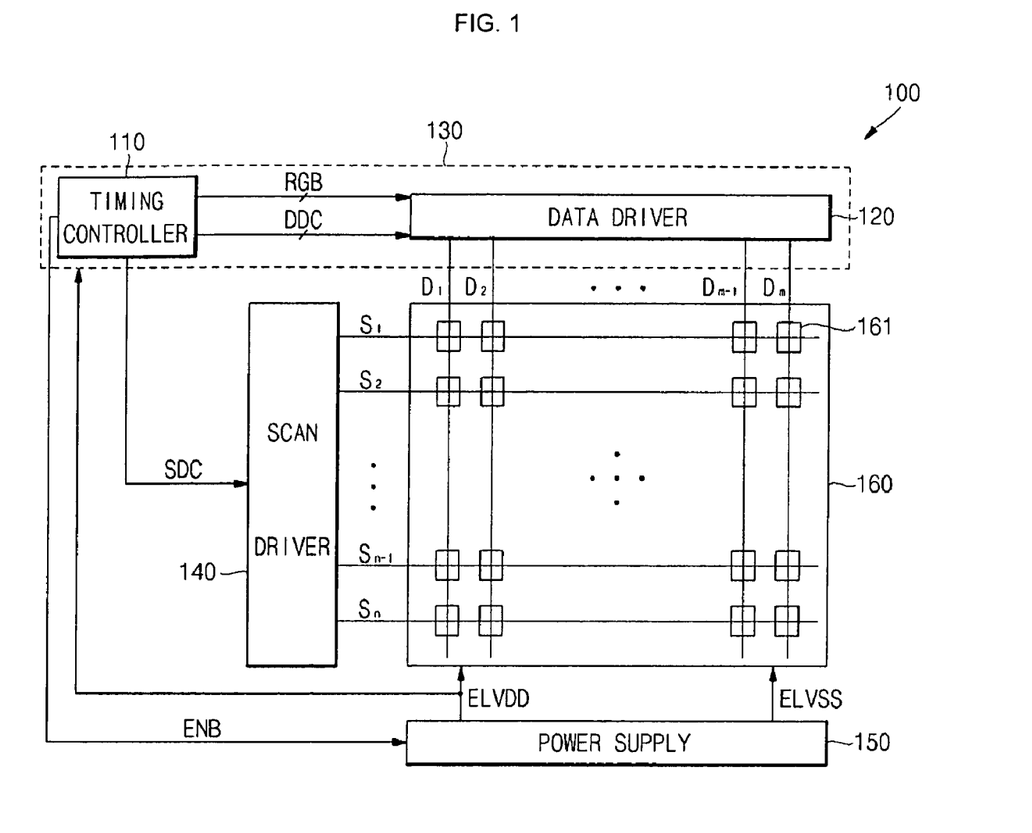
FIG. 1 is a block diagram illustrating an organic light emitting display according to one exemplary embodiment of the present invention.

FIG. 1 is a block diagram illustrating an organic light emitting display according to one exemplary embodiment of the present invention.

Referring to FIG. 1, the organic light emitting display 100 includes a timing controller 110, a data driver 120, a scan driver 140, a power supply 150 and an organic light emitting display panel 160. The timing controller 110 and the data driver 120 may be formed of one driver 130 (e.g., an Integrated Circuit ("IC")), but the present invention is not limited thereto.

The timing controller 110 supplies digital image data RGB to the data driver 120, and outputs control signals DDC and SDC for controlling the data driver 120 and the scan driver 140 by using a synchronized signal. In addition, the timing controller 110 outputs control signals ENB and SWC for controlling a power supply 150 and a switching unit 121 (Shown in FIG. 4, for example).

The data driver 120 converts the digital image signal RGB into an analog image signal, and outputs the analog image signal. For this, the data driver 120 generates gamma voltages for desired gray levels by using a reference voltage and plural voltage division resistance circuits. The data driver 120 selects the each divided gamma voltage according to the digital image data, and supplies the selected analog image data to a data line (one of D1 to Dm) of each pixel circuit, which will be explained in more detail below.

The scan driver 140 generates a scan signal SC (Shown in FIG. 2, for example) synchronized with the data signal in response to the control signal SDC from the timing controller 110, and sequentially supplies the scan signal SC to scan lines S1 to Sn coupled to the pixel circuits.

The power supply 150 supplies ELVDD power of high level and ELVSS power of low level to the organic light emitting display panel 160. In other words, the ELVDD power of high level and ELVSS power of low level are supplied to each pixel circuit. Further, the power supply 150 supplies the ELVDD power as the reference power that enables the data driver 120 to generate gamma power, which will be explained in more detail below. In addition, after the timing controller 110 or the driver IC 130 is operated, the power supply 150 is operated in response to the control signal ENB outputted from them.

The organic light emitting display panel 160 includes m number of data lines D1 to Dm, and n number of scan lines S1 to Sn, and m×n number of pixel circuits 161 arranged in a matrix format at crossings between the data lines and the scan lines, which will be also explained in more detail below.

Figure 2:
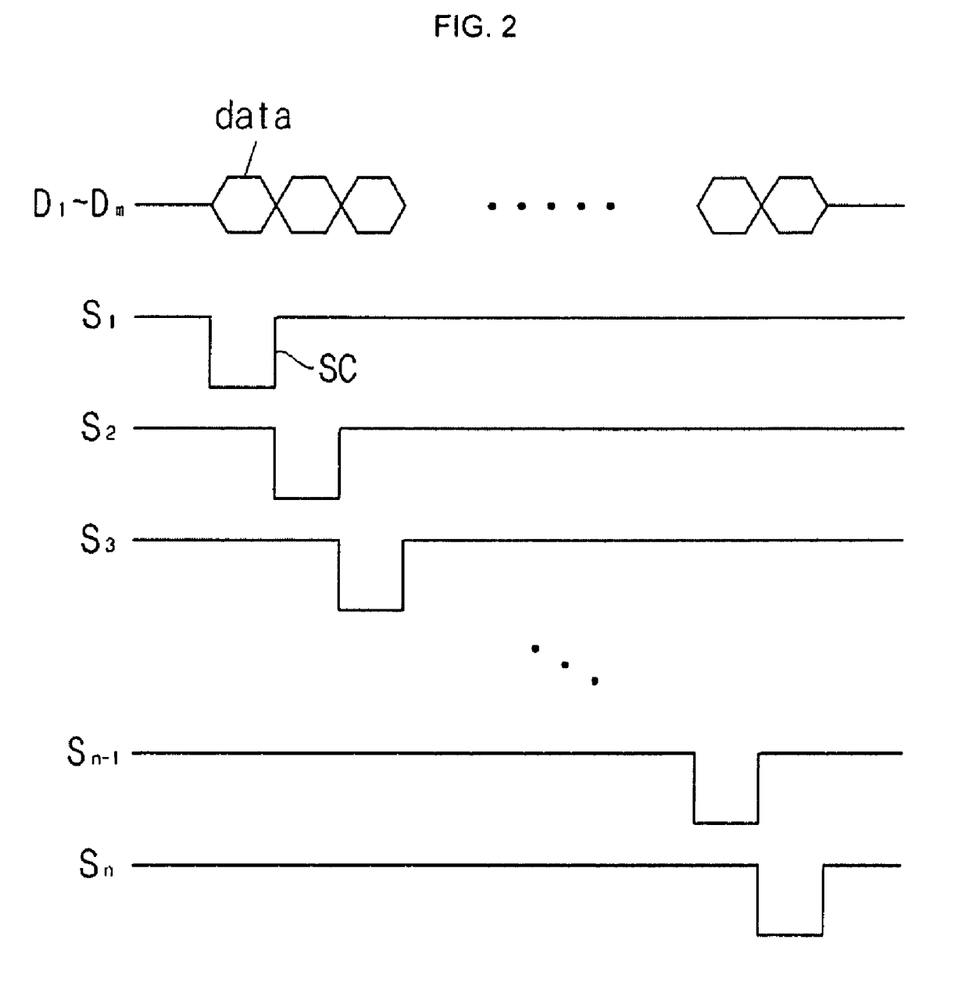
FIG. 2 is a waveform diagram illustrating an example of a drive signal supplied to the organic light emitting display.

FIG. 2 shows a waveform diagram illustrating an example of a drive signal supplied to the organic light emitting display.

Referring to FIG. 2, the data signal data from the data driver 120 is applied through the data lines D1 to Dm scan line by scan line. The scan signal SC is sequentially selected and applied to the scan lines line by line. Accordingly, when any one scan line is selected by a scan signal SC, the data signal is concurrently applied to a row of pixel circuits 161 coupled to the selected scan line.

Figure 3:
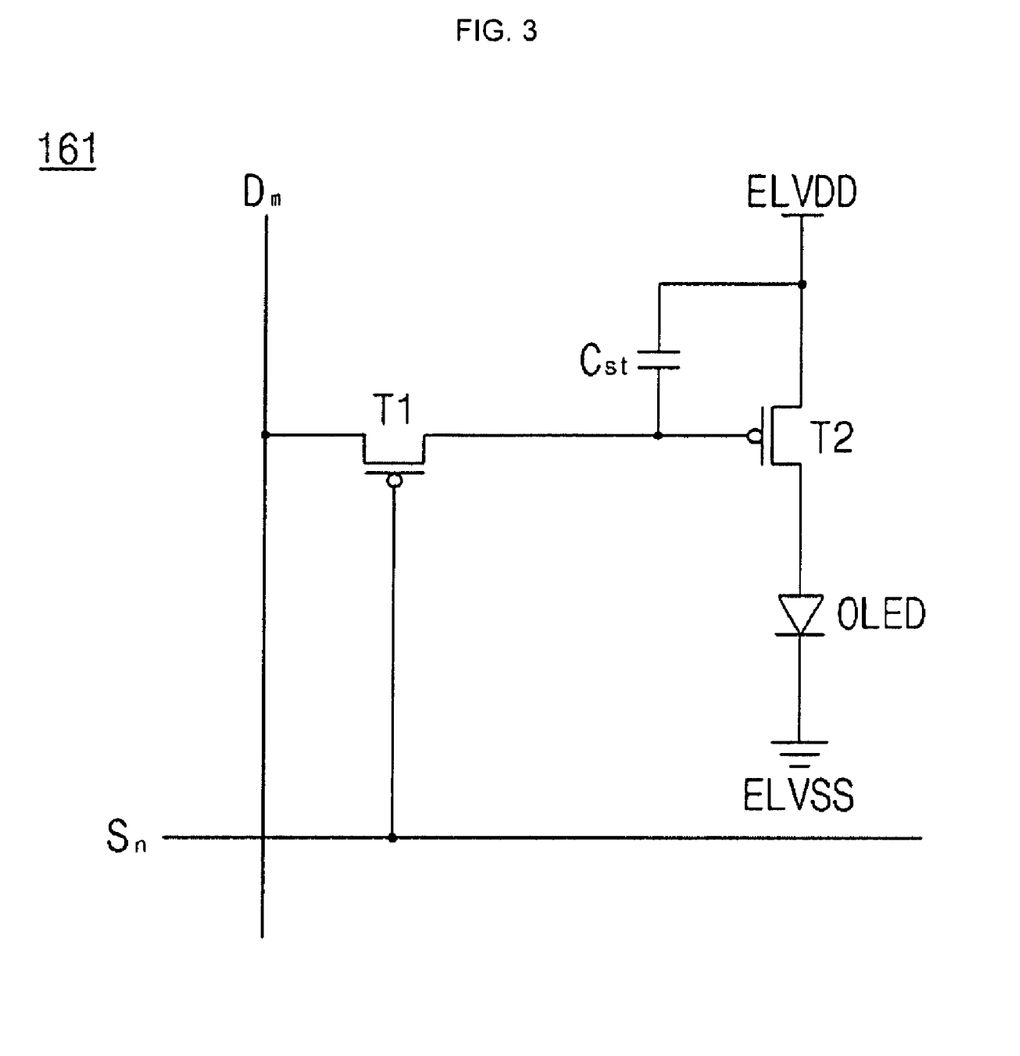
FIG. 3 is a circuit diagram illustrating an example of a pixel circuit of the organic light emitting display.

FIG. 3 shows a circuit diagram illustrating an example of a pixel circuit of the organic light emitting display.

Referring to FIG. 3, the pixel circuit includes a switch transistor T1, a drive transistor T2, a storage capacitor Cst and an organic light emitting diode (OLED). Here, the switch transistor T1 and the drive transistor T2 may be for example P type MOSFETs, but the present invention is not limited thereto. A relatively simple pixel circuit having two transistors and one capacitor (i.e., 2 TR 1 CAP configuration) is shown as one example in FIG. 3. In practice, however, more complicated and various types of pixel circuits may be used, and the present invention is not limited to any particular configurations or types of pixel circuits.

A control electrode of the switch transistor T1 is electrically coupled to the scan line Sn, and a first electrode (source electrode or drain electrode) of the switch transistor T1 is electrically coupled to the data line Dm. A second electrode (the other one of the source electrode or the drain electrode) of the switch transistor T1 is electrically coupled to a first electrode of the storage transistor Cst and a control electrode of the drive transistor T2.

A first electrode (source electrode or drain electrode) of the drive transistor T2 is electrically coupled to a second electrode of the storage capacitor Cst and the ELVDD power. Here, the ELVDD power corresponds to a high level power supplied from the power supply 150. In addition, a second electrode (the other one of the source electrode or the drain electrode) of the drive transistor T2 is electrically coupled to an anode of the organic light emitting diode (OLED).

The first electrode of the storage capacitor Cst is electrically coupled to the second electrode of the switch transistor T1 and the control electrode of the drive transistor T2, and a second electrode of the storage capacitor Cst is electrically coupled to the ELVDD power and the drive transistor T2 as described above.

The anode of the OLED is electrically coupled to the second electrode of the drive transistor T2, and a cathode of the OLED is electrically coupled to the ELVSS power. Here, the ELVSS power corresponds to a low level power supplied from the power supply 150.

As described above, the switch transistor T1 of the pixel circuit 161 is turned on in response to the scan signal applied to the scan line Sn, thereby forming a current path between the first and second electrodes of the switch transistor T1. When the switch transistor T1 is turned on, the data signal is applied to the control electrode of the drive transistor T2 and the first electrode of the storage capacitor Cst via the first and second electrodes of the switch transistor T1.

When the switch transistor T1 is turned off, the current path is opened (i.e., no current path) between the first and second electrodes. Thus, the data signal is not transmitted to the drive transistor T2 through the data line Dm.

The drive transistor T2 controls an amount of current that flows between its first and second electrodes according to the data signal supplied to the its control electrode, thereby controlling the current flowing to the OLED, such that the OLED emits light with brightness corresponding to the data signal.

In addition, the storage capacitor Cst stores a voltage difference between the data signal and the high level of ELVDD power, and keeps a voltage applied to the control electrode of the drive transistor T2 substantially constant during one frame period. As described above, the organic light emitting diode (OLED) emits light with brightness corresponding to the current from the drive transistor T2.

The current Id flowing in the organic light emitting diode (OLED) is calculated by a mathematical formula as follows.

$$Id = \beta/2 * (Vsg - |Vth|)^2$$

Here, β is a constant related to electron mobility, Vsg is a voltage (i.e., a source-gate voltage) between the first electrode and the control electrode of the drive transistor T2 and Vth is a threshold voltage of the drive transistor T2.

In addition, the voltage (gate-source voltage) between the control electrode and the first electrode of the drive transistor T2 is calculated by a following mathematical formula.

$$Vgs = Vdata - Vth - ELVDD$$

Here, Vdata is a data voltage applied to the drive transistor T2, and ELVDD is a voltage supplied by the power supply.

As described above, the current Id that flows to the organic light emitting diode (OLED) is determined by Vgs applied to the drive transistor T2 according to the mathematical formula. Here, the current Id is changed according to the change of the ELVDD power even if Vdata is kept constant by the gamma voltage generator. In one embodiment according to the present invention, it is possible to prevent the gray levels displayed on the organic light emitting display panel from being changed according to the change of the ELVDD power by using the ELVDD power as the reference power of the gamma voltage generator. For example, when ELVDD is increased, Vdata is increased according to the increased amount, and when ELVDD is decreased, Vdata is decreased according to the decreased amount, thereby keeping Vgs and Id corresponding to the same desired gray level to be substantially the same.

Figure 4:
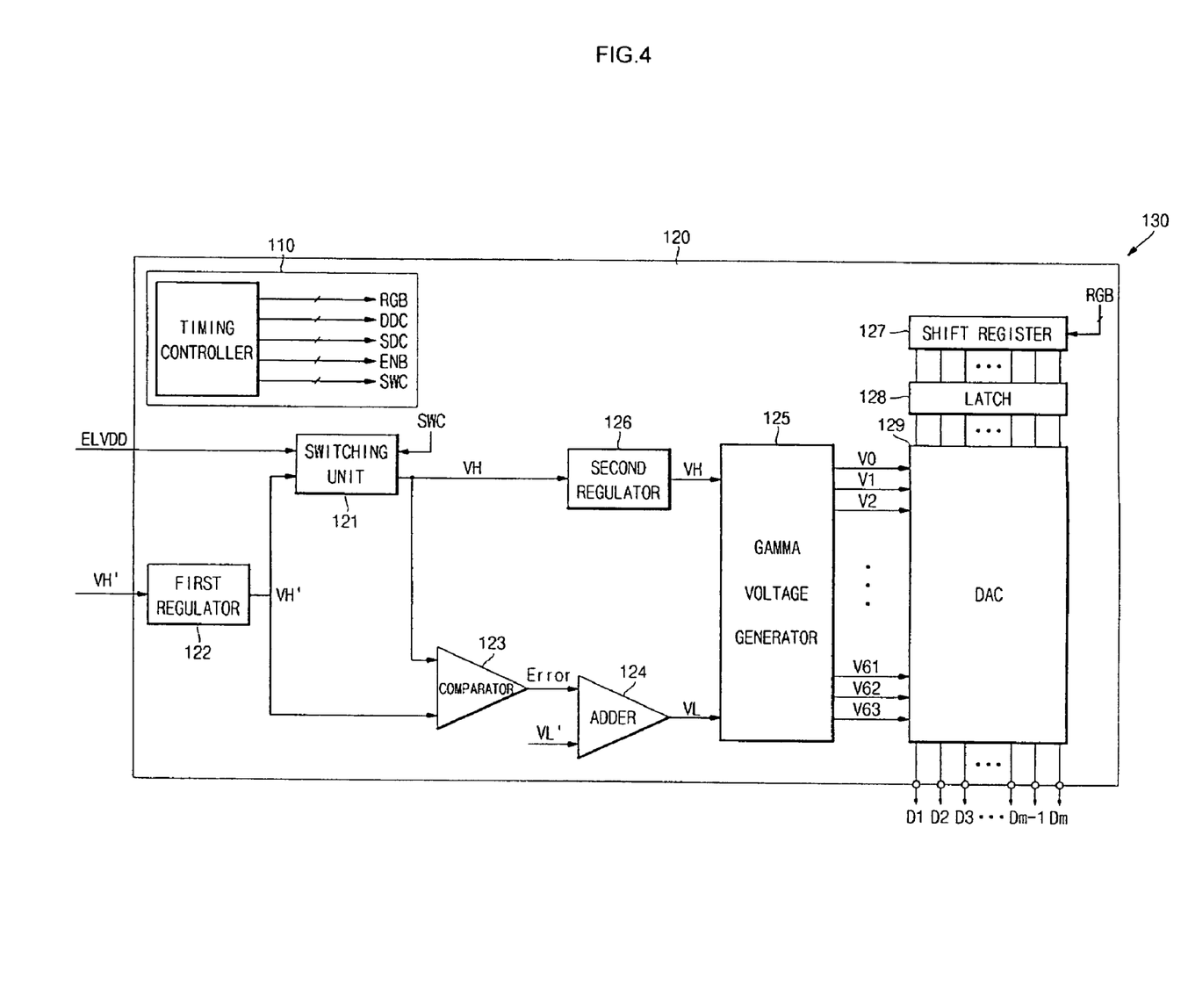
FIG. 4 is a block diagram illustrating a timing controller and a data driver of the organic light emitting display.

FIG. 4 shows a block diagram illustrating construction of a timing controller and a data driver of the organic light emitting display according to one embodiment of the present invention.

Referring to FIG. 4, the data driver 120 includes a switching unit 121, a first regulator 122, a comparator 123, an adder 124, a gamma voltage generator 125 and a second regulator 126.

Here, the timing controller 110, the switching unit 121, the first regulator 122, the comparator 123, the adder 124, the gamma voltage generator 125 and the second regulator 126 may be formed of one driver IC 130, but the present invention is not limited thereto. In other embodiments, two or more ICs can be used to implement these components.

The switching unit 121 selects and outputs a first source power ELVDD or a second source power VH' as a first reference power VH. The first source power ELVDD refers to a high level ELVDD supplied from the power supply 150. In one embodiment, the second source power VH' refers to a power other than that of the power supply 150, that is level-shifted by a level shifter (not shown). In addition, the switching unit 121 outputs the second source power VH' as the first reference power VH in response to a control signal SWC of the timing controller 110 at the time of first driving, and after a period of time (e.g., a predetermined time period), outputs the first source power ELVDD as the first reference power VH. In other words, the timing controller 110 outputs an enable signal ENB to the power supply 150 after operation of the data driver 120, thereby enabling the power supply 150 to output the high level ELVDD power and the low level ELVSS power to the organic light emitting display panel 160. When the ELVDD power is outputted as described above, the timing controller 110 immediately outputs a control signal SWC to the switching unit 121, thereby enabling the switching unit 121 to output the ELVDD power as the first reference power VH.

The first regulator 122 is electrically coupled between the switching unit 121 and the comparator 123. The second source power VH' is inputted to the first regulator 122 by a separate level shifter. The first regulator 122 stabilizes the second source power VH', and then outputs it to the switching unit 121 and the comparator 123.

The comparator 123 compares the first reference power VH from the switching unit 121 and the second source power VH' with each other, and outputs the difference value between them.

For example, when the second source power VH' is outputted as the first reference power VH through the switching unit 121, the same power is inputted to the comparator 123 through the switching unit 121 and the first regulator 122. Thus, the comparator 123 does not output a difference value. In other words, there is substantially no difference between the first reference power VH and the second source power VH', since the switching unit 121 supplies the second source power VH' as the first reference power VH.

However, after the output of the switching unit 121 changes from the second source power VH' to the first source power ELVDD, a difference may be generated between the first reference power VH from the first source power ELVDD and the second source power VH'. Thus, the comparator 123 may output a difference value (e.g., a predetermined difference value) as an Error.

The adder 124 adds the difference value from the comparator 123 to an initial second reference power, and outputs the sum value to the gamma voltage generator 125 as a second reference power VL.

As described above, the adder 124 changes the second reference power VL when the first reference power VH is changed. For example, when the level of the first reference power VH (that is, the level of the first source power ELVDD) is increased toward the 'plus' direction, the adder 124 increases the level of the second reference power VL by the increased amount of the first reference power VH, and then inputs the increased second reference power VL to the gamma voltage generator 125. However, when the level of the first reference power VH is decreased toward the 'minus' direction, the adder 124 decreases the level of the second reference power VL by the decreased amount of the first reference power VH, and then inputs the decreased second reference power VL to the gamma voltage generator 125.

The second regulator 126 is electrically coupled to the switching unit 121 and further stabilizes the first reference power VH outputted from the switching unit 121, and then outputs the first reference power VH to the gamma voltage generator 125. Optionally, the second regulator 126 may directly input the first reference power VH from the switching unit to the gamma voltage generator 125. Here, the first reference power VH from the second regulator inputted to the gamma voltage generator has a relatively high level, and the second reference power VL from the adder inputted to the gamma voltage generator has a relatively low level.

As described above, substantially the same level difference is always kept between the first reference power VH and the second reference power VL. In other words, when the first reference power VH is relatively increased, the level of the second reference power VL is increased by the increased amount of the first reference power. When the first reference power VH is relatively decreased, the level of the second reference power VL is decreased by the decreased amount of the first reference power.

The gamma voltage generator 125 generates and outputs gamma voltages corresponding to plural gray levels by using the first reference power VH and the second reference power VL. Of course, plural voltage division resistance circuits are formed inside the gamma voltage generator 125. It is well known that the gamma voltage is generated by the voltage division resistance circuits, and thus explanation for the construction and operation will be omitted. In the described embodiment, the reference power of the gamma voltage generator 125 is also changed when the ELVDD power from the power supply 150, that is, the first source power ELVDD is changed. Thus, the gray levels displayed by the organic light emitting display panel 160 corresponding to the same input data signals are kept substantially the same.

A shift register 127 for sequentially storing digital image data RGB is electrically coupled to the timing controller 110. A latch 128 that keeps one line of digital image data for a period of time (e.g., a predetermined time) is connected to the shift register 127. A digital-analog converter 129 is electrically coupled to the latch 128 and gamma voltage generator 125 for outputting analog image data to the organic light emitting display panel 160 by using the gamma voltage corresponding to the digital image data. In addition, plural data lines D1 to Dm are electrically coupled to the digital-analog converter 129.

Main operations of the timing controller 110 and the data driver 120 of the organic light emitting display 100 will be described below.

First, when a user turns on the organic light emitting display 100, the second source power VH' that is level-shifted by the level shifter is inputted to the first regulator 122.

Then, the first regulator 122 stabilizes the second source power VH' and then outputs the second source power VH' to the switching unit 121 and the comparator 123 concurrently. At this time, the first source power ELVDD is not yet inputted from the power supply 150.

Next, the switching unit 121 outputs the second source power VH' as the first reference power VH.

Then, the first reference power VH from the switching unit 121 and the second source power VH' from the first regulator 122 are inputted to the comparator 123.

Accordingly, the comparator 123 compares the first reference power VH with the second source power VH', and outputs the difference value between them. However, at this time, the first reference power VH is substantially the same as the second source power VH'. Thus, there is no output for the difference value.

The adder 124 outputs the initial second reference power VL' as the second reference power VL of the gamma voltage generator 125. In addition, the first reference power VH output by the switching unit 121 is also stabilized by the second regulator 126, and then outputted as the first reference power VH to the gamma voltage generator 125. Thus, the gamma voltage generator 125 generates plural gamma voltages by using the first reference power VH corresponding to the second source power VH' and the second reference power VL corresponding to the initial second reference power VL'.

The timing controller 110 outputs an enable signal ENB to the power supply 150 after the operation of the data driver 120, that is, the driver IC 130. Then, the power supply 150 is operated and outputs a high level ELVDD power and a low level ELVSS power used as power of the organic light emitting display panel 160. Here, the ELVDD outputted from the power supply 150 is used as the first source power ELVDD inputted to the switching unit 121.

As described above, after the timing controller 110 outputs the enable signal ENB to the power supply 150, the timing controller 110 immediately outputs the control signal SWC to the switching unit 121. The switching unit 121 outputs the first source power ELVDD instead of the second source power VH' as the first reference power VH in response to the control signal SWC. Here, the first source power ELVDD is the ELVDD power from the power supply 150.

At this time, the first reference power VH (i.e., the first source power ELVDD) from the switching unit 121 is inputted to the comparator 123. In addition, the second source power VH' is inputted to the comparator 123 as described above.

Thus, the comparator 123 compares the first reference power VH with the second source power VH' and outputs a difference value between them when there is a difference. For example, when the level of the first reference power VH is increased in comparison to the level of the second source power VH', the difference value according to the increased amount is outputted. Further, when the level of the first reference power VH is decreased in comparison to the level of the second source power VH', the difference value according to the decreased amount is outputted. Of course, the difference value is inputted to the adder 124.

The adder 124 adds the difference value to the level-shifted initial second reference power VL', and then outputs the second reference power VL to the gamma voltage generator 125.

For example, when the difference value is increased toward the 'plus' direction, the adder 124 increases the level of the second reference power VL by the increased amount, and then outputs the second reference power VL. On the contrary, when the difference value is decreased toward the 'minus' direction, the adder 124 decreases the level of the second reference power VL by the decreased amount, and then outputs the second reference power VL.

In other words, when the level of the first reference power VH inputted to the gamma voltage generator 125 as a reference value is relatively increased toward the 'plus' direction, the level of the second reference power VL is increased by the increased amount of the first reference power VH. On the contrary, when the level of the first reference power VH is decreased toward the 'minus' direction, the level of the second reference power VL is decreased by the decreased amount of the first reference power VH.

Thus, when the ELVDD power, that is, the first source power ELVDD is changed by the power supply 150, the levels of the first reference power VH and the second reference power VL are changed according to the change of the ELVDD power. Thus, even if the ELVDD power is changed by the power supply 150, the reference voltage inputted to the gamma voltage generator 125 is changed in response to the change of the ELVDD power, thereby keeping the grayscale of the organic light emitting display panel 160 substantially constant. In other words, the gray levels of the OLEDs corresponding to the same input data signals (i.e., input image signals) remain substantially the same regardless of the changes to the level of the ELVDD power.

For example, if the ELVDD power is changed from 4.2V to 4.3V by the power supply 150, the first source power ELVDD, that is, the first reference power VH is also changed from 4.2V to 4.3V. At this time, the comparator 123 comparing the first reference power VH with the second source power VH' outputs a difference value of about +0.1V to the adder 124. Then, if the initial second reference power VL' is 3.0V, the adder 124 adds the difference value of +0.1V to 3.0V, and then outputs a second reference power VL of 3.1V. That is, the gamma voltage generator 125 receives 4.2V as the first reference power VH initially, and then 4.3V. In addition, the gamma voltage generator 125 receives 3.0V as the second reference power VL initially, and then 3.1V. In other words, the first reference power VH and the second reference power VL are respectively increased by 0.1V. However, the total level difference, that is, the difference of 1.2V is not changed.

At this time, the gamma voltage generator 125 generates gamma voltages having V0 to V63 levels, for example. Because the reference voltage is changed as described above, the gamma voltages of V0 to V63 levels, are changed. That is, the gamma voltage of V0 level is changed, for example, from 4.2V to 4.3V, and the gamma voltage of V63 level is changed, for example, from 3.0V to 3.1V.

As described above, the digital-analog converter 129 selects the corresponding gamma voltage by using the digital image data RGB inputted from the shift register 127 and the latch 128. The gamma voltages of V0 to V63 levels are changed according to the change of the ELVDD, and thus a gamma voltage different from the previous gamma voltage is selected. Accordingly, an analog data signal different from the previous analog signal is outputted. In other words, the analog data signal is outputted to the data lines in such a manner that brightness of each pixel circuit is not changed by the changed ELVDD power. For example, when the ELVDD power is increased, the analog data signal increased by the increase of the ELVDD power is outputted, and when the ELVDD power is decreased, the analog data signal decreased by the decrease of the ELVDD power is outputted. Thus, the grayscale of the organic light emitting display panel 160 is kept substantially constant regardless of the change of the ELVDD power. In other words, even when the ELVDD power changes, the OLEDs will emit light having substantially the same gray levels in response to the input data signals having substantially the same voltage levels.

The construction and operation of the present invention may be also used in any other suitable display device, for example, a liquid crystal display device.

As described above, the power of the power supply supplying power to the organic light emitting display panel is used as the reference power, thereby allowing the reference power inputted to the gamma voltage generator to be changed according to change of the power supplied to the organic light emitting display panel. Thus, the grayscale of the organic light emitting display panel can be kept substantially constant.

In addition, the grayscale of each manufactured organic light emitting display panel can be maintained to be substantially uniform and the grayscale can be kept substantially constant even if the size of the organic light emitting display panel is increased.

What is claimed is:

1. An organic light emitting display comprising:
an organic light emitting display panel comprising a plurality of pixels for displaying an image;
a switching unit for selecting and outputting a first source power or a second source power as a first reference power;
a comparator for comparing the first reference power with the second source power and outputting a difference value between the first reference power and the second source power;
an adder for adding the difference value to an initial second reference power to output a second reference power, such that a voltage level of the second reference power is changed when a voltage level of the first reference power is changed; and
a gamma voltage generator for generating plural gamma voltages to be utilized for displaying the image on the organic light emitting display panel by utilizing the first and second reference powers.

2. The organic light emitting display of claim 1, further comprising a power supply coupled to the switching unit and the organic light emitting display panel, the power supply for supplying the first source power to the switching unit and the organic light emitting display panel.

3. The organic light emitting display of claim 2, wherein the power supply further supplies the organic light emitting display panel with power having a voltage level that is lower than the voltage level of the first source power.

4. The organic light emitting display of claim 2, further comprising a timing controller coupled to the power supply, wherein the timing controller outputs an enable signal, thereby allowing the power supply to output the first source power.

5. The organic light emitting display of claim 4, wherein the switching unit initially outputs the second source power as the first reference power and then outputs the first source power as the first reference power in response to a control signal of the timing controller.

6. The organic light emitting display of claim 4, further comprising:
a shift register coupled to the timing controller and configured to receive digital image data sequentially;
a latch coupled to the shift register and configured to store one line of the digital image data for a time period; and
a digital-analog converter electrically coupled to the gamma voltage generator and the latch, the digital-analog converter for outputting analog image data corresponding to the digital image data to the organic light emitting display panel by utilizing the gamma voltages corresponding to the digital image data.

7. The organic light emitting display of claim 6, wherein the switching unit, the comparator, the shift register, the digital-analog converter and the timing controller are integrally formed in one driver IC.

8. The organic light emitting display of claim 2, wherein the second source power and the initial second reference power are powers that are level-shifted by a power source different from the power supply.

9. The organic light emitting display of claim 1, further comprising a voltage regulator between the switching unit and the comparator, wherein the voltage regulator stabilizes the second source power and supplies the second source power to the switching unit and the comparator.

10. The organic light emitting display of claim 1, further comprising a voltage regulator between the switching unit and the gamma voltage generator, where the voltage regulator stabilizes the first reference power.

11. The organic light emitting display of claim 1, wherein the first reference power has a voltage level that is higher than the voltage level of the second reference power.

12. The organic light emitting display of claim 1, wherein when the voltage level of the first reference power is increased, the adder increases the voltage level of the second reference power by an increased amount of the first reference power, and when the voltage level of the first reference power is decreased, the adder decreases the voltage level of the second reference power by a decreased amount of the first reference power.

13. The organic light emitting display of claim 1, wherein the organic light emitting display panel further comprises a plurality of scan lines and a plurality of data lines coupled to the plurality of pixels, wherein the gamma voltages are utilized to provide analog image data signals to the pixels through the data lines.

14. A method of driving an organic light emitting display, the method comprising:
selecting a first source power or a second source power to output as a first reference power;
comparing a voltage level of the first reference power supplied to a gamma voltage generator with a voltage level of the second source power; and
adding a difference between the voltage levels of the first reference power and the second source power to an initial second reference power to output a second reference power, such that a voltage level of the second reference power is changed when a voltage level of the first reference power is changed, and providing the second reference power to the gamma voltage generator, the gamma voltage generator generating plural gamma voltages to be utilized for displaying an image on the organic light emitting display by utilizing the first and second reference powers.

15. The method of claim 14, further comprising applying the second source power to a voltage regulator to stabilize the second source power prior to comparing the second source power with the first reference power.

16. The method of claim 14, further comprising applying the first reference power to a voltage regulator to stabilize the first reference power prior to applying the first reference power to the gamma voltage generator.

17. The method of claim 14, wherein the second source power is initially supplied as the first reference power when the organic light emitting display is turned on.

18. The method of claim 17, wherein the first source power is supplied as the first reference power in response to a control signal applied to a switching unit for selecting the first source power.

* * * * *